United States Patent
Walton

(10) Patent No.: US 11,228,209 B1
(45) Date of Patent: Jan. 18, 2022

(54) WIRELESS POWER TRANSFER SYSTEM AND METHOD

(71) Applicant: Apple Inc., Cupertino, CA (US)

(72) Inventor: Robert Walton, Auckland (NZ)

(73) Assignee: Apple Inc., Cupertino, CA (US)

( * ) Notice: Subject to any disclaimer, the term of this patent is extended or adjusted under 35 U.S.C. 154(b) by 472 days.

(21) Appl. No.: 16/053,228

(22) Filed: Aug. 2, 2018

Related U.S. Application Data

(60) Provisional application No. 62/540,136, filed on Aug. 2, 2017.

(51) Int. Cl.
*H02J 50/05* (2016.01)
*H02J 50/12* (2016.01)
*H02J 7/02* (2016.01)

(52) U.S. Cl.
CPC .............. *H02J 50/12* (2016.02); *H02J 7/025* (2013.01); *H02J 50/05* (2016.02)

(58) Field of Classification Search
CPC .................................. H02J 50/12; H02J 50/05
USPC .......................................................... 307/104
See application file for complete search history.

(56) References Cited

U.S. PATENT DOCUMENTS

| | | | | |
|---|---|---|---|---|
| 2009/0284218 A1* | 11/2009 | Mohammadian | ....... | H01F 38/14 320/107 |
| 2012/0181980 A1* | 7/2012 | Ichikawa | ................ | H02J 50/70 320/108 |
| 2014/0327321 A1* | 11/2014 | Kusunoki | ............ | H04B 5/0037 307/104 |
| 2015/0130286 A1* | 5/2015 | Kozasu | ................ | H02J 7/0042 307/104 |

* cited by examiner

*Primary Examiner* — Daniel Cavallari
*Assistant Examiner* — Dru Parries
(74) *Attorney, Agent, or Firm* — Fletcher Yoder PC

(57) ABSTRACT

A wireless power transfer system comprising a transmitter and a receiver. The transmitter arranged to generate a varying electric field, and the receiver located in the varying electric field. The receiver comprising a first element and a second element. The first element and the second element having different geometries so different charge densities are induced on the first element and the second element by the varying electric field such that, in use, a current flows between the first element and second element, through a load connected between the first element and second element.

14 Claims, 11 Drawing Sheets

WIRELESS POWER TRANSFER SYSTEM AND METHOD

FIELD OF THE INVENTION

The present invention relates to a wireless power transfer system, components thereof and method. More particularly, but not exclusively the invention relates to an electric field based wireless power transfer system, components thereof and method.

BACKGROUND TO THE INVENTION

Contactless or wireless power transfer systems are a known area of both established and developing technology. Wireless power transfer systems can take a number of different forms. The particular form is application dependent. Inductive and capacitive power transfer are the most commonly known used power transfer methodologies.

A basic inductive power transfer system comprises an AC power source, a primary coil, a secondary coil and a load. The AC power source is coupled to the primary coil. The primary coil is connected to the AC source forming a closed circuit. The AC source supplies a current to the primary coil which creates a magnetic field that radiates outwardly from the coil. The magnetic field is coupled to the secondary coil and induces a current in the secondary coil. The induced current is used to supply a load connected to the secondary coil.

A basic capacitive power transfer system comprises an AC power source, a first plate pair, a second plate pair and a load. The AC power source is coupled to a first plate the first plate pair creating an electric field. The electric field from the first plate induces a charge on the second plate of the first plate pair. Current flows from the second plate, through a load to a third plate of the second plate pair. The third plate becomes charged resulting in a second electric field that induces charge in the fourth plate of the second plate pair and current flows from the fourth plate back to the source, thus forming a complete circuit.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY OF THE INVENTION

It is an object of the present invention to provide for wireless power transfer system, components thereof or method that ameliorates or alleviates at least one disadvantage associated with the prior art, or at least provide a useful alternative to related art systems.

Disclosed is a wireless power transfer system, method and components thereof. In particular disclosed herein is an electric field based wireless power transfer system, method and components thereof.

According to one exemplary embodiment there is provided a wireless power transfer system comprising: a transmitter configured to create a varying electric field and a receiver within the varying electric field. The receiver in the varying electric field being separated from the transmitter and the receiver comprising a first element and a second element. The first element having a first geometry and the second element having a second different geometry to the first element. The electrical characteristics/behaviour of each element being different to each other when in the varying electric field, such that a current flows between the first element and second element when connected to a load due to interaction between the varying electrical field and the first element and the second element.

The transmitter comprises a plate, the receiver first element is a plate and the second element is a sphere (or other spheroid)

The first element is governed by Gaussian planar symmetry and the second element is governed by Gaussian spherical symmetry The electric characteristic of each element being the polarization of each element in the presence of the varying electric field.

The varying electric field polarizing the first element of the receiver to a first level, the varying electric field polarizing the second element of the receiver to a second level, wherein the difference in polarization causes a current to flow between the first element and second element and through a load electrically connected between the first and second element.

The electric characteristic is electrical field effect from the varying electric field, wherein the first and second elements experience a different electrical field effect thereby causing a current to flow through a load connected between the first and second element.

In an embodiment each of the first and second elements experiences a different electrical field effect due to the different geometry of the first and second elements.

According to a further exemplary embodiment there is provided a wireless power transfer system comprising; a transmitter arranged to generate a varying electric field and a receiver located in the varying electric field. The receiver comprising a first element and a second element, the first element and the second element having different geometries so different charge densities are induced on the first element and the second element by the varying electric field such that, in use, a current flows between the first element and second element, through a load.

The transmitter comprises a planar conductive transmission element for generating a varying electric field.

The first element and the second element comprise three dimensional geometries that are different to each other.

The first element and second element are conductive elements.

The second element may function as a charge well to receive charges. In one form the second element may be configured to temporarily store charge received by the second element.

The first element comprises a planar surface. The preceding claims wherein the second element comprises a curved or rounded surface.

The first element is a three dimensional planar element and the second element is a rounded three dimensional element.

In one form the first element is a plate and the second element is one of a sphere, spheroid, ellipsoid, toroid, or cylindrical in shape. Do they have to be curved, or could they be for example inverted pyramid? Alternatively the first plate may comprise a three dimensional shape that includes a plurality of planar sides or surfaces. For example the first plate may comprise an inverted pyramid shape.

The second element is preferably hollow but alternatively the second element may be solid.

Preferably the first element is solid. Preferably the transmission element is solid.

The first element is a rectangular prism in shape (i.e. a rectangular plate), and the second element is a sphere or spherical in shape.

The first element comprises a geometry that functions as a Gaussian planar surface and the second element comprises a geometry that functions as a Gaussian curved surface.

Preferably the first element comprises a first Gaussian geometry and the second element comprises a second Gaussian geometry, wherein the first and second Gaussian geometries are different to each other.

In another form first element may be a three dimensional polygon with multiple planar faces such as for example the first element may be a pyramid shaped element or an octahedron or a hexahedron or any other three dimensional polygon with planar faces. In another form the second element may be any three dimensional shape that includes a continuous curved surface such as for example a sphere or a cylindrical prism.

In one form the first element comprises geometry (i.e. shape) that is governed by a Gaussian plate symmetry and the second element comprises a geometry (i.e. shape) that is governed by a Gaussian spherical symmetry.

The planar surface of the first element is substantially parallel to the planar conductive transmission element.

The transmitter and the receiver are separated by a transmission distance and the transmission distance is less than the point where the transmitter can be considered a point charge.

The first element and the second element are separated by a conduction distance, wherein the conduction distance is greater than or equal to zero and wherein the conduction distance is less than the point where the varying electric field has no effect on the second element.

In one form the transmission distance and conductive distance are different to each other.

In another form the transmission distance between the first and second elements and the transmission plate is the same.

In an embodiment the wireless power transfer system further comprises a load and a conductor, the conductor electrically coupling the first element and second element, the conductor further electrically coupled to the load, such that a current flows between the first element and second element through the conductor and the load. The receiver comprises the load and a conductor. The conductor electrically couples the first element and second element, the conductor further being electrically coupled to the load, such that a current flows between the first element and second element through the conductor and the load. The load is an electrical load and the electrical load disposed between the first element and the second element.

The load comprises a load element and an electrical circuit electrically coupled to the load element, wherein the circuit is configured for electrically transferring power to the load element and the load element is configured to consume power.

In an embodiment the load element is part of the receiver. In one example the load element may be a rechargeable power source such as a rechargeable battery.

The surface area of the transmitter is greater than or equal to the surface area of the first element of the receiver.

The surface area of the planar conductive transmission element is greater than or equal to the surface area of the planar surface of the first element.

The second element has a surface area that is greater than or equal to the surface area of the first element.

Alternatively the surface area of the second element may be less than or equal to the surface are of the first element. In one exemplary form if the second element is a hollow sphere or a hollow element, then the surface area may be less than the surface area of the first element when the first element is a plate.

Preferably the first element comprises a rectangular cross section. Alternatively the first element comprises a square cross section.

The second element comprises a circular cross section. Alternatively the second element comprises an elliptical cross section or an oval cross section.

In an embodiment the wireless power transfer system further comprises an alternating power source in electrical communication with the transmitter, the varying electric field being created due to an alternating current being supplied to the transmitter. The transmitter preferably comprises the alternating power source and the alternating power source is arranged to be in electronic communication with the transmission element.

In an embodiment the power supply comprises a plurality of switches, the transmission element connected downstream of a first switch and upstream of a second switch, the switches connecting to a positive and negative rail.

In an embodiment the switches are configured to control charging and discharging of the transmission element.

In an embodiment the first switch is closed and the second switch is open to charge the transmission element, and the first switch is open and the second switch is closed when to discharge the transmission element.

Additionally the power supply may comprise a controller configured to control the actuation of the switches based on a predetermined switching pattern to achieve a desired rate of charging and discharging of the transmission element.

The alternating power source enriches and depletes the transmitter with charge, thereby creating the varying electric field.

The wireless power transfer system wherein work is performed by the alternating power source to generate the varying electric field and the load configured to harvest the work done by the alternating power source.

The varying electric field causing charge migration between the first and second element due to the varying electric field having a different effects on the first element and the second element, and wherein the charge migration between the first and second element resulting in a current to flow between the first element and the second element, and in use through a load.

In one exemplary implementation the electric field power transfer system may be used for charging or for powering portable devices or mobile devices or wearable devices or any other suitable electrical devices. For example the electric field transfers power from the transmission element to the receiver. The receiver is preferably installed as part of a device that requires power or requires charging. The transmission element may be part of a charging mat or a charging pod.

Alternatively the transmission element may be incorporated into a structure such as a floor or table or any other structure upon which a device can be rested. The power transferred from the transmission element can be used or consumed by the receiver to power the device or to charge a power source. Some exemplary uses of the electric field power transfer system may be to power a wearable device such as a chargeable earphones or a watch or a fitness tracker. Another exemplary use may be to charge mobile phones or tablets or laptops or other portable electronic devices.

According to an exemplary embodiment there is provided a receiver of a wireless power transfer system comprising; a first element and a second element. The first element and second element comprising different geometries as compared to each other such that different charge densities are induced thereon in the presence of a varying electric field, and, in use, a current flows between the first element and the second element through a load.

The first element and the second element are conductive elements. The first element and second element may be spaced apart.

The first element and the second element comprise three dimensional geometries (i.e. shapes) that are different to each other.

The first element comprises a geometry that functions as a Gaussian planar surface and the second element comprises a geometry that functions as a Gaussian curved surface.

Preferably the first element comprises a first Gaussian geometry and the second element comprises a second Gaussian geometry, wherein the first and second Gaussian geometries are different to each other.

In one form the first element comprises geometry (i.e. shape) that is governed by a Gaussian plate symmetry and the second element comprises a geometry (i.e. shape) that is governed by a Gaussian spherical symmetry Preferably the first element comprises a planar surface. Preferably the second element comprises a curved or rounded surface. The second element is arranged or configured to function as a charge well.

In one form the first element is three dimensional planar element and the second element is a rounded three dimensional element.

Preferably the first element is a plate. The second element is one of a sphere, spheroid, ellipsoid, toroid or cylindrical in shape. Preferably the second element is a sphere.

Preferably the first element is solid and preferably the second element is hollow. Alternatively the second element is solid.

The first element preferably comprises a rectangular or square cross section. The second element comprises a circular cross section.

In an embodiment the receiver comprises load and a conductor, the conductor electrically coupling the first element and second element, the conductor further electrically coupled to the load such that a current flows between the first element and the second element through the conductor and the load. The load is an electrical load and the electrical load is disposed between the first element and the second element. The load comprises a load element and an electrical circuit electrically coupled to the load element, wherein the circuit is configured for electrically transferring power to load element and the load element is configured to consume power.

According to an exemplary embodiment there is provided a transmitter of a wireless power transfer system comprising: a conductive transmission element arranged to generate a varying electric field, in use, the transmitter configured to cause a current flow in a receiver positioned within the varying electric field, the receiver further having two elements having different geometries, and the current flow being caused by the varying electric field inducing different charge densities on the two elements.

The transmission element is a planar member or comprises one or more planar or flat surfaces. The transmission element is preferably a plate.

The transmission element comprises a rectangular or square cross section.

Preferably the transmission element is a solid member. Alternatively the transmission element may be a hollow member.

In an embodiment the transmitter further comprises an alternating power source, the alternating power source electrically coupled to the transmission element, the alternating power source charging and discharging the transmission element with an electrical charge. The charging and discharging of the transmission element with electrical charge creates a varying electric field. When the transmission element is enriched with electric charge an electric field is built that extends outwardly from the transmission element. When the charge from the transmission element is depleted (i.e. discharged), the electric field emanating from the transmission element reverses. Alternatively the electric field may dissipate because the power source is switched off i.e. no power is delivered to the transmitter.

In an embodiment the power supply comprises a plurality of switches, the transmission element connected downstream of a first switch and upstream of a second switch, the switches connecting to a positive and negative rail.

In an embodiment the switches are configured to control charging and discharging of the transmission element.

In an embodiment the first switch is closed and the second switch is open to charge the transmission element, and the first switch is open and the second switch is closed when to discharge the transmission element.

Additionally the power supply may comprise a controller configured to control the actuation of the switches based on a predetermined switching pattern to achieve a desired rate of charging and discharging of the transmission element.

According to an exemplary embodiment there is provided a wireless power transfer system comprising; a transmitter coupled to an alternating current/power source, the transmitter configured to generate a varying electric field a receiver positioned within the varying electric field, the receiver comprising a first element, a second element and a load element electrically connectable therebetween, wherein work is performed by the alternating current/power source to generate the varying electric field, and the load element harvesting the work done by the alternating current/power source.

The varying electric field has a first effect on the first element and a second effect on the second element, the first effect being different to the second effect. The first element and second element comprising different geometries as compared to each other. The varying electric field having a different effect on the first element and the second element due to their different geometries.

The varying electric field inducing different charge densities on the first element and the second element due to their differing geometries and, in use, causing a current to flow between the first element and the second element and through a load connectable therebetween. Energy is transferred from the transmitter to the receiver via the varying electric field.

In an embodiment of the wireless power transfer system, the first element, of the receiver, comprises a first geometry, the second element, of the receiver, comprises a second geometry, the first geometry being different to the second geometry in at least one aspect. The one aspect may be any one of surface area, a surface contour, cross section, cross sectional area, volume, density or overall three dimensional shape.

According to a further embodiment there is provided a wireless power transfer system comprising; a transmitter arranged to generate a varying electric field, a receiver positioned within the varying electric field, the receiver comprising a first element, a second element, the first element and second element being differently shaped such that the varying electric field causing charge migration between the first element and second element due to different effects of the varying electric field on the first element and the second element, the charge migration resulting in a current to flow between the first element and second element and through a load element that is connectable between the first and second element.

According to another embodiment there is provided a wireless power transfer system comprising; a transmitter arranged to generate a varying electric field, a receiver positioned within the varying electric field, the receiver comprising a first element and second element, the varying electric field causing the first element to switch polarity in response to the varying electric field, thereby causing a current to flow between the first element and the second element based on the switching polarity, and wherein the current flows in use when a load element is electrically coupled between the first and second elements.

The first element and second element comprise different geometries as compared to each other. The varying electric field causing a different effect on the first element and second element as compared to each other due to the different geometries.

According to yet another embodiment there is provided a wireless power transfer system comprising; a transmitter arranged to generate a varying electric field, a receiver positioned within the varying electric field, the receiver comprising a first element and a second element, a load element electrically connectable between the first and second elements, the first and second element having different geometries that are governed by different Gaussian symmetries to each other such that different charge densities are induced thereon (or causing charge migration between the first and second element due to the different Gaussian symmetries), such that a current flows between the first element and second element and through the load element.

According to an embodiment there is provided a wireless power transfer system comprising; a transmitter arranged to generate a varying electric field, a receiver positioned within the varying electric field, the receiver comprising a first element and a second element, a load element electrically connectable between the first and second elements, wherein the receiver is arranged in an open circuit and a current is induced to flow between the first element and second element and through the load element, the current flowing between the first element and second element due to the varying electric field acting on the first element and the second element.

According to an embodiment there is provided a wireless power transfer system comprising; a transmitter arranged to generate a varying electric field, a receiver positioned within the varying electric field, the receiver comprising a first planar element and a second curved/rounded element being spaced apart and electrically coupled together, and a load electrically connectable between the first planar element and the second curved/rounded element, the varying electric field having a different effect on the first planar element and the second curved/rounded element, thereby inducing a current to flow between the first planar element and the second curved/rounded element and through the load element.

The transmitter and receiver as described herein can be used with or in any embodiment of the wireless power transfer system. The transmitter and receiver as described herein form components of any of the wireless power transfer systems described herein.

According to a further embodiment there is provided a method for wirelessly transferring power from a transmitter to a receiver, the transmitter comprising a conductive transmission element, the receiver comprising a first element and a second element comprising the steps of: generating a varying electric field by a transmitter, inducing different charge densities on the first element and the second element when the receiver is disposed in the varying electric field, a current flowing between the first element and second element and through a load, due to the different charge densities being induced on the first element and the second element.

The different charge densities are induced on the first element and the second element because the first element and second element have different geometries when compared to each other.

The first element and second element comprise different geometries that are governed by Gaussian symmetry differentials when compared to each other. Preferably the first element comprises a geometry such that the first element is governed by a Gaussian plate symmetry. The second element comprises a geometry such that the second element is governed by a Gaussian sphere symmetry. The differing Gaussian symmetries of the first element and second element induce differing charge densities due to the individual effect on each element by the varying electric field.

According to a further embodiment there is provided a method for wirelessly transferring power from a transmitter to a receiver, the transmitter comprising a conductive transmission element, the receiver comprising a first element and a second element, and the first element and second element comprising different geometries such that there is a Gaussian symmetry differential between the first element and second element, the method comprising the steps of; generating a varying electric field by the transmitter, causing the first element to switch polarity in response to the varying electric field, thereby causing a current to flow between the first element and second element and through a load.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner. The term geometry denotes a shape or topology. The terms geometry, topology and shape can be interchangeably.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner Gaussian geometry as used in this specification means a geometry (i.e. shape) of a three dimensional shape through which the flux of a vector field is calculated, wherein the vector field is an electric field but could be a magnetic field or gravitational field. Preferably the geometry (i.e. shape) is a closed shape. Gaussian symmetry as used in this specification refers to a principle in which the geometry (i.e. shape) of an element or a surface of the element is such that an electric field is constant along the geometry.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The present invention will now be described by way of example only and with reference to the accompanying drawings in which.

DETAILED DESCRIPTION OF EMBODIMENTS

The general terms the wireless power transfer system, components thereof and wireless power transfer method described herein, relate to an electric field based wireless power transfer system, components thereof and method.

In general terms the present disclosure relates to a wireless power transfer system or components thereof (more generally defined as "a wireless power transfer apparatus") and wireless transfer power method for wirelessly transferring power from a transmitter to a load via a receiver. The wireless power transfer apparatus/method utilises an electric field to transfer power from the transmitter to the receiver.

In an embodiment the wireless power transfer system comprises a transmitter and a receiver. The transmitter configured to create a varying electric field. The receiver is disposed in the varying electric field. The receiver includes a first element and a second element. The first element and second element have different geometries compared to each other. The varying electric field has differing effects on the first element and the second element due their differing geometries. The varying electric field effect on each element induces differing charge densities on the first element and second element, and causes a current to flow between the first element and second element and through a load electrically connected between the first and second elements. The differing effects of the varying electric field causes charge migration between the first element and second element thereby resulting in a current flow through the load and between the first element and the second element. Energy is transferred through the varying electric field and the load harvests work done by an alternating power source that is configured to create a varying electric field from the transmitter.

Figure 1:
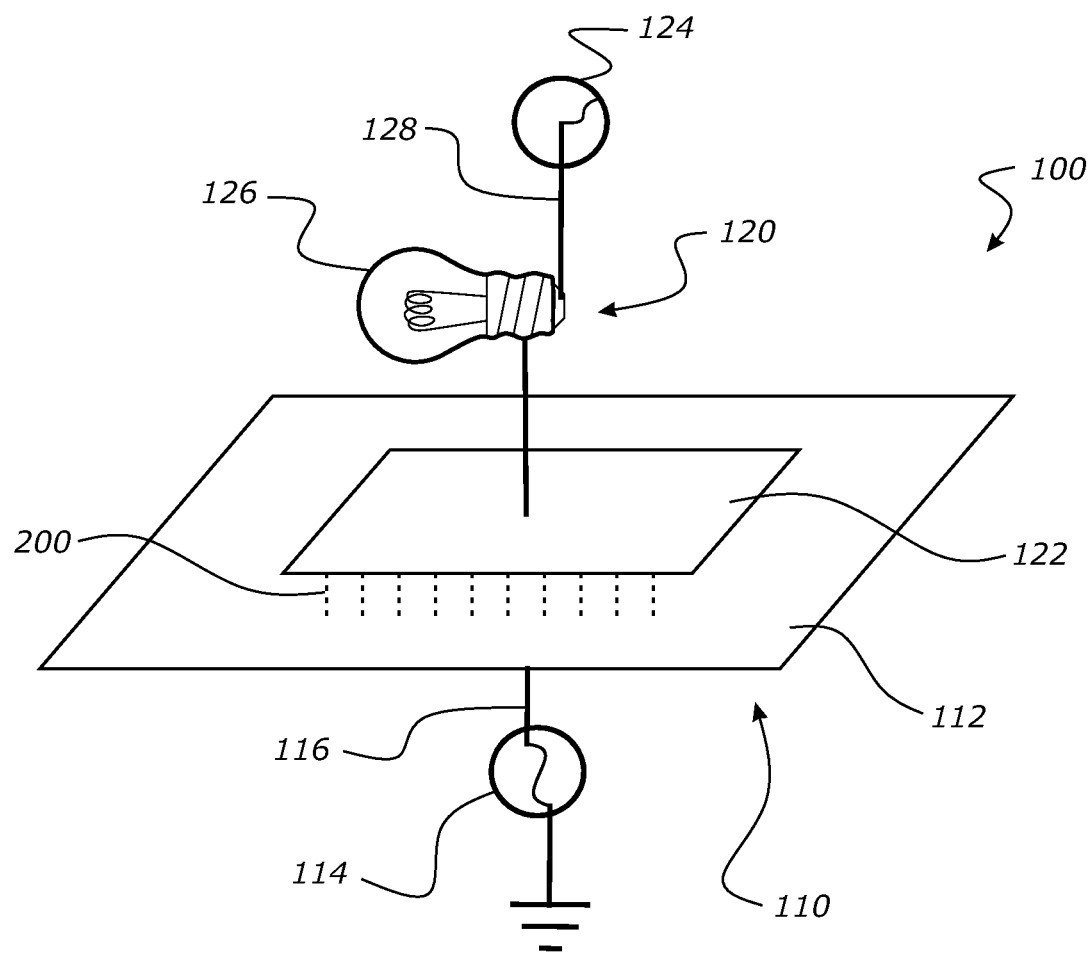
FIG. 1 shows an embodiment of a wireless power transfer system and components thereof.
Figure 2:
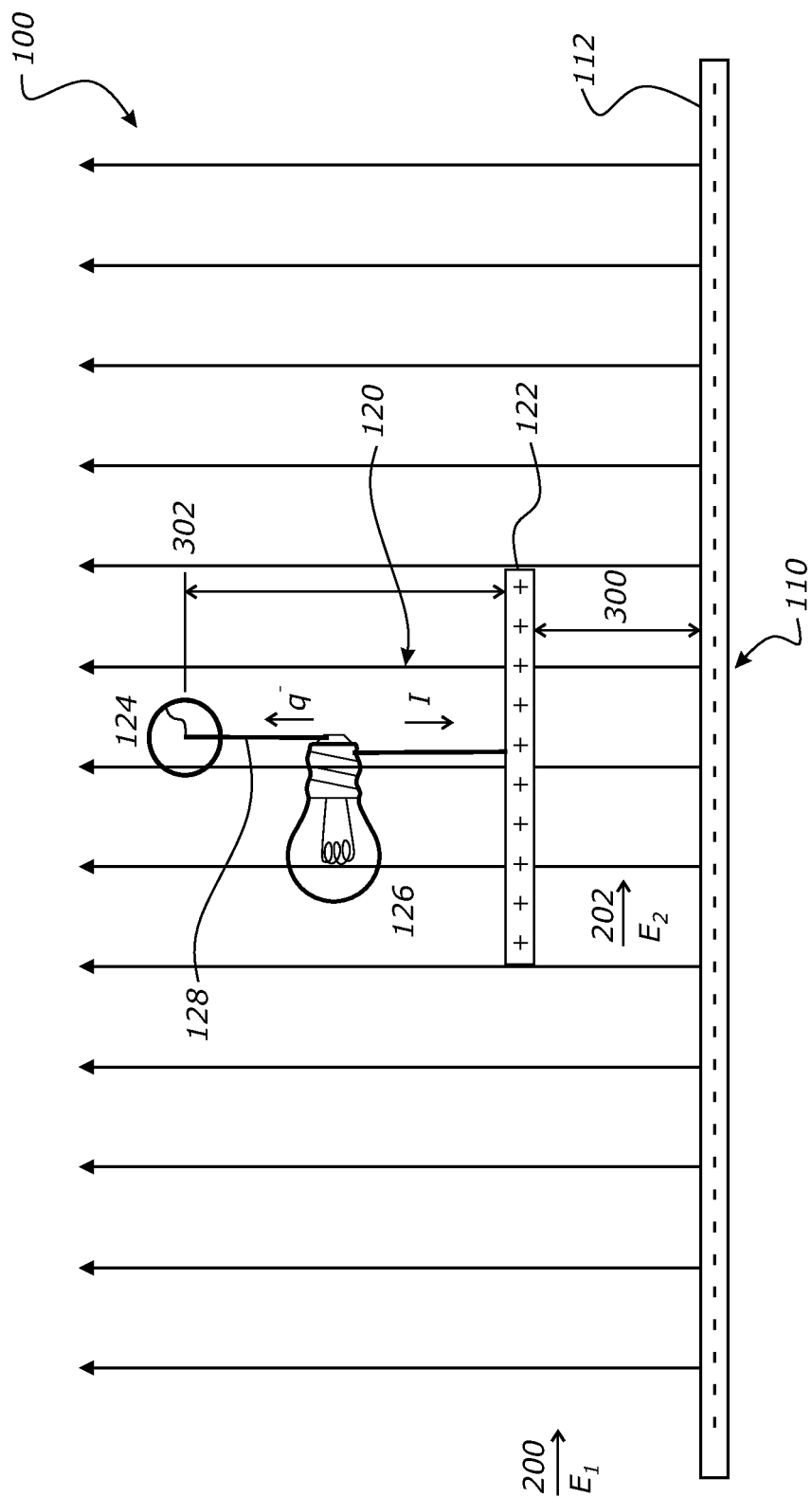
FIG. 2 shows a schematic view of the operation of the wireless power transfer system and components thereof shown in FIG. 1.

An exemplary embodiment of a wireless power transfer apparatus and method of wireless power transfer will be described with respect to FIGS. 1 and 2. FIG. 1 shows an exemplary embodiment of a wireless power transfer system 100 and components thereof. FIG. 2 shows a schematic view of the operation of the wireless power transfer system and its components of FIG. 1. The wireless power transfer system 100 comprises a transmitter 110 arranged to generate an electric field 200. The wireless power transfer system 100 further comprises a receiver 120 located within the electric field 200. The electric field 200 may be a varying electric field.

Referring to FIGS. 1 and 2, the receiver 120 comprises a first element 122 and a second element 124. The first element 122 and second element 124 are conductive elements and formed from any suitable conductive material, such as for example a metal. The receiver 120 is adapted for connection to a load 126. In use, the load 126 is electrically coupled between the first element 122 and the second 124. The receiver 120 additionally comprises a conductor 128 that extends between and electrically couples the first element 122 and second element 124. As shown in FIG. 1, the load 126 is disposed between the first element 120 and the second element 124 and the load 126 is electrically coupled to the conductor 128. In some alternative embodiments the receiver 120 may comprise the load 126 and any components that make up the load.

The load 126 as shown in FIGS. 1 and 2, is a light bulb. Alternatively the load 126 may be any other suitable component that can consume or use electrical power. In a further alternative form the load 126 may comprise a load element and an electrical circuit electrically coupled to the load element. The electric circuit, of the load 126, may be configured for electrically transferring power to the load element wherein the load element is configured to consume power. The load and circuit could be a battery and charging circuit, for example as part of a mobile phone or wearable device such as chargeable earphones or a watch. Alternatively the load 126 may be a transformer or motor or any other suitable component that consumes electrical power.

The transmitter 110 comprises a conductive transmission element 112. As shown in FIG. 1 the transmitter 110 is connectable an alternating power source 114. The alternating power source 114 can be an AC power source such as wall power supply or any other suitable AC power source. The alternating power source 114 is electrically connectable to the transmission element 112 through a supply conductor 116. The alternating power source is configured to provide an alternating current to the transmission element 112 via a supply conductor 116. The transmission element 110 is configured to generate a varying electric field due to the received alternating current. In an embodiment the transmitter 110 comprises the alternating power source 114.

The transmission element 112 is a planar element. The transmission element 110 includes at least one flat or planar surface. As shown in FIG. 1 the transmission element 110 is a plate comprising a rectangular cross section. Alternatively the transmission element 110 may comprise any other suitable shape that comprises a planar surface such as for example a tetrahedron, a dodecahedron or octahedron or any other suitable three dimensional shape with flat or planar surfaces. The transmission element 112 is preferably a solid planar element. Alternatively the transmission element 112 may be a hollow planar element.

The transmission element 110 can be implemented for example as a portable charging pad or integrated into furniture as a top charging surface e.g. on the top surface of a desk or table, or may be integrated into a floor as a charging floor or may be integrated into a charging pod or charging module. Additionally the transmission element 110 may be covered with an insulating material such as a plastic to avoid electrical discharge to people or other conducting devices. An insulating layer or insulating material can be disposed on the transmission element when used in as a charging pad or charging mat in the exemplary implementations described above.

The first element 122 and second element 124, of the receiver 120, comprise geometries (also termed "shapes" or "topologies") that are different to each other. The first element 122 comprises a first geometry and the second element 124 comprises a second shape or geometry or topology, wherein the first shape or geometry or topology is different to the second geometry. The first element 122 and the second element 124 comprise three dimensional geometries that are different to each other.

The first element 122 comprises a planar surface. The first element 122 may be of a shape that comprises a plurality of planar surfaces. In the illustrated embodiment shown in FIG. 1 the first element 122 is a plate or rectangular prism. The first element 122, as shown in FIG. 1 comprises a rectangular cross section. Alternatively for example the first element 122 may be a three dimensional polygon that comprises a plurality of planar surfaces such as for example a tetrahedron or octahedron or dodecahedron or rectangular prism. The first element 122, of the receiver 120, is preferably solid i.e. does not comprise a hollow interior.

The second element 124 comprises curved or rounded surface. The second element 124 comprises a curved or rounded three dimensional shape. In the illustrated embodiment shown in FIG. 1 the second element 124 is a spheroid or sphere in shape. The second element 124 comprises a smooth external surface. Alternatively the second element 124 comprises a curved or rounded three dimensional shape such as for example an ellipsoid, toroid or cylindrical in shape. The second element 124, of the receiver 120, is preferably hollow. In the illustrated embodiment shown in FIG. 1, the second element 124 is a hollow sphere or spheroid. Alternatively the second element 124 may be a solid element.

The first element 122 and the second element 124, of the receiver 120, have different geometries that function as having different Gaussian geometries. The first element 122 and second element 124 comprise Gaussian geometries or shapes that are different to each other. In particular the first element 122 and second element 124 comprise geometries that are governed by different Gaussian symmetries i.e. the first and second element have Gaussian symmetry differentials.

The first element 122 comprises a geometry (i.e. shape) that is governed by a Gaussian plate symmetry. The second element 124 comprises a geometry (i.e. shape) that is governed by a Gaussian spherical symmetry. Alternatively the second element 124 may comprises a geometry such that the second element geometry is governed by a Gaussian toroidal symmetry or a Gaussian cylinder symmetry.

FIG. 2 shows a schematic view of the wireless power transfer apparatus (i.e. the wireless power transfer system and components thereof) 100 in use. Referring to FIG. 2, the transmitter 110 and the receiver 120 are separated by a transmission distance 300. The transmission distance 300 may be variable. In particular the transmission distance 300 can be variable by moving the receiver 120 away or toward the transmitter 110. The transmission distance 300 is less than the point where the transmitter 110 can be considered a point charge by the receiver 120.

The first element 122 and the second element 124 are separated by a conduction distance 302. The conduction distance 302 is greater than or equal to zero. The conduction distance 302 may be variable by moving the second element 124 away from the first element 122.

Figure 3:
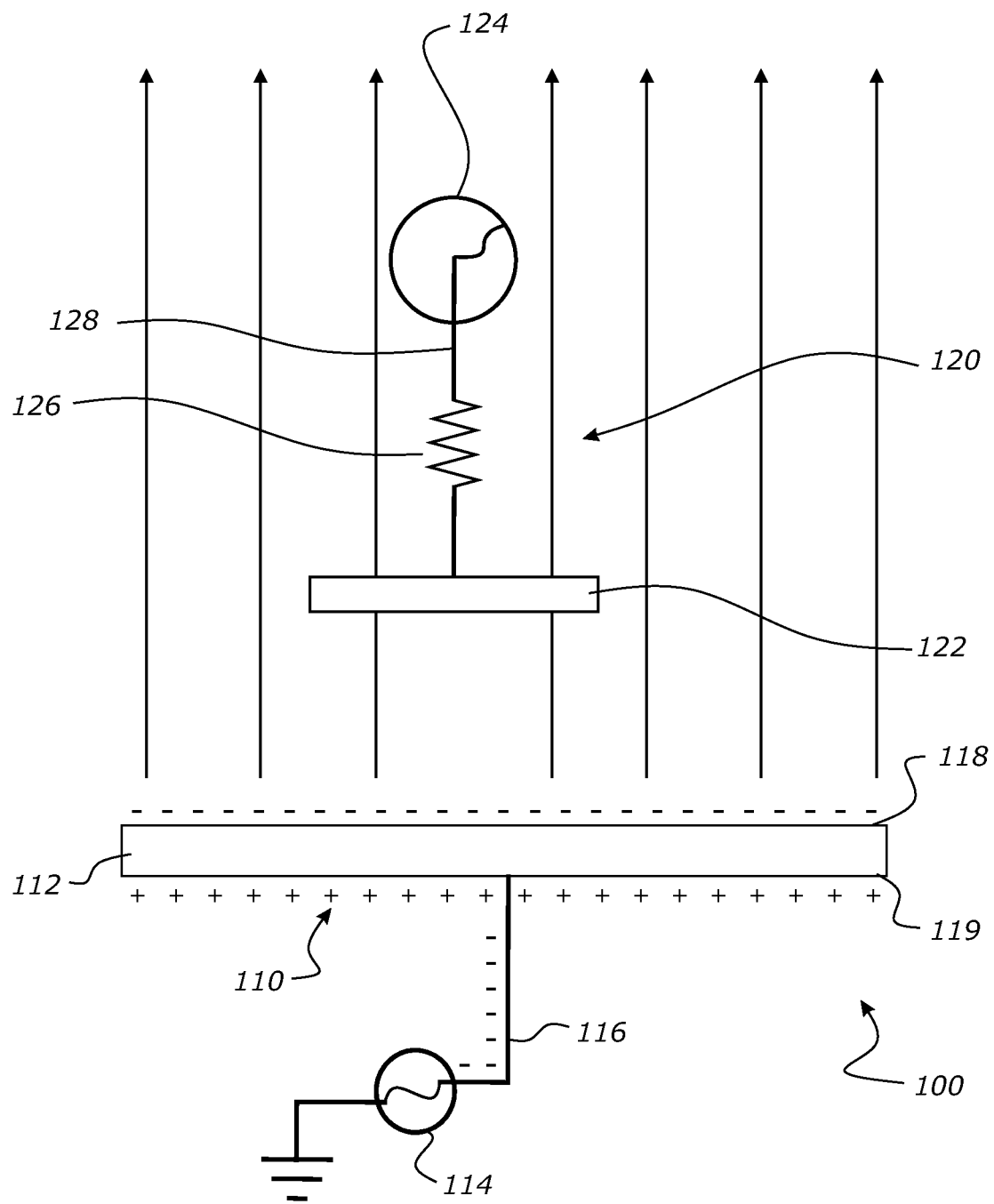
FIGS. 3 to 7 show a step by step operation of the wireless power transfer system and components thereof shown in FIG. 1.

FIG. 3 shows an alternative configuration of the first element 122 and second element 124. As shown in the illustrated configuration of FIG. 3 the second element 124 and the first element 122 are the same distance from the transmission element 112. Therefore the first element 122 and second element 124 are both at the transmission distance 300 from the transmission element 112.

As shown in FIG. 1 and FIG. 2 the transmission element 112 has a larger area than the first element 122 of the receiver 120. The area of a planar surface of the transmitter 112 is greater than the area of a planar surface of the first element 122. The transmission element 112 and the first element 122 are arranged such that a planar surface of the first element 122 is parallel to the planar transmission element 112. As shown in FIGS. 1 and 2, the plate 122 of the receiver is arranged relative to the plate 112 of the transmitter, such that a flat surface of each plate 122 and 112 are arranged parallel to each other. In use, the plate 122 of the receiver is positioned to be parallel to the plate of the transmitter. The surface 112 of the transmission element is larger in area to the corresponding parallel surface of the receiver plate 122.

Operation and function of the wireless power transfer system 100 will now be described in more detail with respect to FIGS. 2-6. FIG. 1 shows an AC power source 114 in electrical connection with the transmission element 112. The AC power source 114 enriches and depletes charge on the transmission element 112. The enrichment and depletion of charge on the transmission element 112 is controlled by the switching frequency of the AC power source. In one example the switching frequency may be 50 Hz however the AC power source 114 may operate at a different frequency. Initially there is an equal charge distribution on all components of the system 100.

The transmitter 110 (specifically the transmission element 112) becomes charged when current is supplied to it. FIG. 2 shows the wireless power transfer apparatus 100 at one instance in time. The transmission element 112 is charged by negative charges on it and the negative charges are represented by the plurality of "−" symbols illustrated on the transmission element 112. The static negative charge on the transmission element generates a first electric field 200 (also shown as $\vec{E_1}$). The first electric field 200 is a varying electric field that is generated or provided by the transmitter 110. The electric field 200 is created and dissipates in synchrony with the charging and discharging (i.e. enriching and depleting) of charge from the transmission element 112. FIG. 2 shows an illustration of the first electric field 200 when it has been created due to the presence of charge on the transmission element 112.

The first electric field 200 is projected outwardly from the transmission element 112. The first electric field 200 projects generally normal or perpendicular to the transmission element 112 since the transmission element is a plate. Alternatively the electric field 200 projects perpendicular to a flat or planar surface of the transmission element 112 if the transmission element comprises a three dimensional geometry (i.e. shape) with one or more planar of flat surfaces such as a three dimensional polygon e.g. an octahedron, rectangular prism, tetrahedron or hexahedron.

FIG. 3 shows the power supply 114 transferring negative charge to the transmission element 112 through the supply conductor 116. The transmission element is a rectangular plate in the illustrated configuration. The negative charges "−" migrate to an outer surface 118 of the transmission element 112. The first electric field 200 builds due to the increased electric charge. An electric charge produces an electric field everywhere. The electric field created due to the vector sum of the electric fields of individual charges as defined by $$\vec{E} = \sum_i \vec{E}_i = \sum_i \frac{1}{4\pi\varepsilon_0} \frac{q_i}{r_i^2} \hat{r}.$$

Where E is the electric field, the electric field at a distance r and q is the point charge. As shown in FIG. 3 due to the presence of the negative charges on the outer surface of the plate, the positive charges are pushed to the inner side 119 of the plate i.e. the side proximal to the power source.

Figure 4:
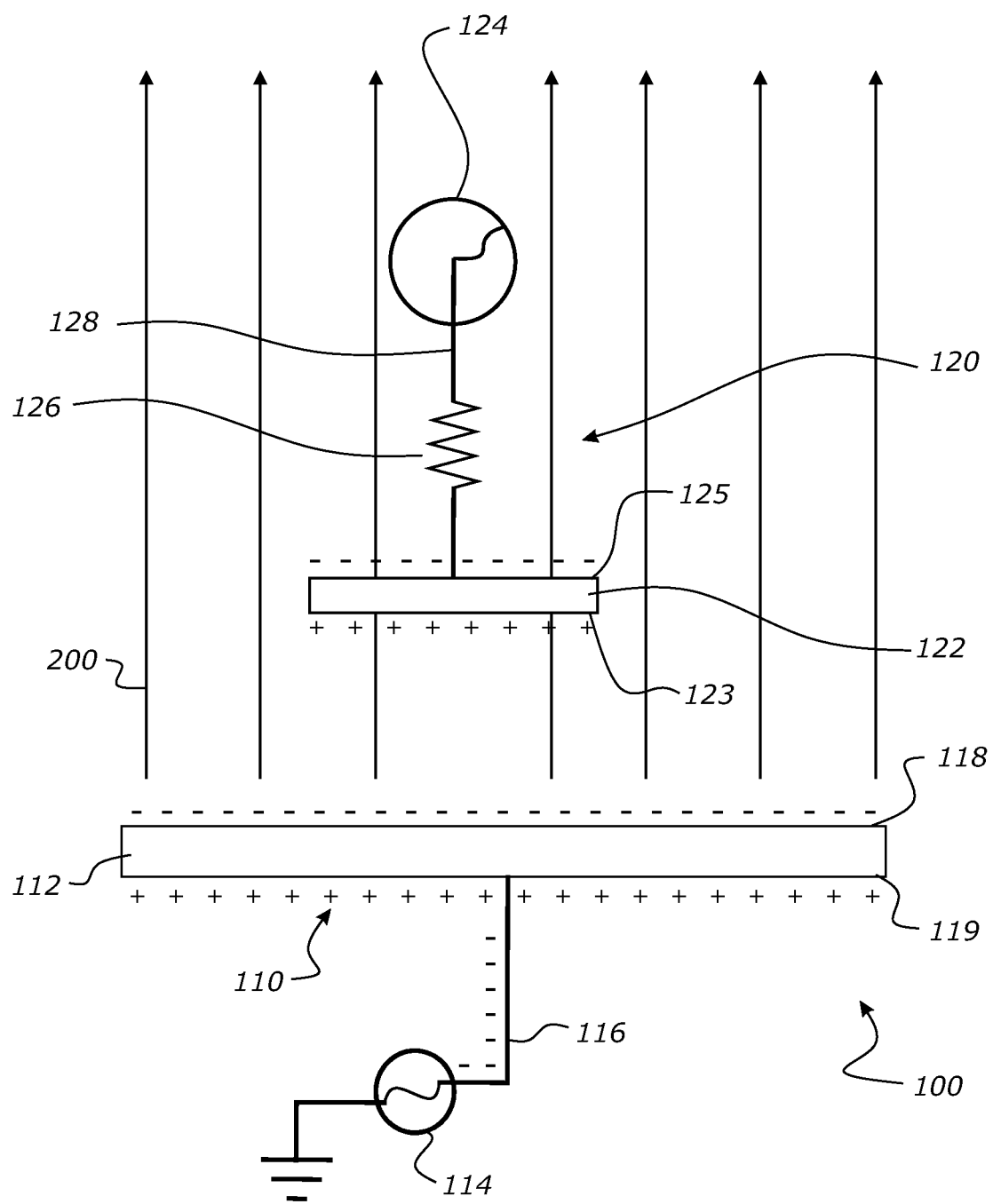

The electric field 200 interacts with the first element 122 and the second element 124 of the receiver 120. In particular the first electric field 200 causes the first element 122 to become polarized due to charge migration of negative charge away from the planar or flat surface of the first element 122 proximal to the transmission element 112. Negative charge moves away due to like charges repelling each other. The force exerted by two like charges q1 and q2 separated by a distance in a vacuum is given by Coulombs Law:

$$\vec{F}_{12} = k_e \frac{q_1 q_2}{r^2} \hat{r},$$

where $k_e$ is a Coulombs constant and $\hat{r} = \vec{r}/r$ is a unit vector directed from q1 to q2. The negative charges on the transmission element 112 repel the negative charges on an proximal surface 123 of the first element 122. The proximal surface 123 is proximal to the outer surface 118 of the transmission element 112. As can be seen in FIG. 4, the proximal surface 123 becomes full of positive charges "+" and a distal surface 125 of the first element becomes negatively charged due to the charge repulsion. Opposing forces between a proximal surfaces of the transmission element 112 (i.e. first plate) and the first element 122 (i.e. second plate) causes negative charges to move away from the transmission element 112, on the first element 122. This results the plate of the first element 122 becoming polarized. The forces exerted on the negative charges on the first element 122 is defined by the Coulombs law equation provided above.

A second electric field 202 (also shown as $\vec{E}_2$) builds due to the charge on the first element 122 (i.e. second plate). The second electric field 202 has a constant effect on the first element 122 of the receiver 120, irrespective of the transmission distance 300. The transmission distance 300 can be any distance as long as the transmission element 112 (i.e. the first plate) is not seen as a point charge by the first element 122 of the receiver 120. A planar or flat surface of the transmission element 112 and a planar or flat surface of the first element 122 being arranged parallel to each other to optimize interaction between the first element 122 and the first electric field 200. The effect of a constant electric field (i.e. the first electric field $200(\vec{E}_1)$) on a plate shaped first element is in accordance to Gaussian planar symmetry. This is because the geometry of the first element 122 is one that is governed by Gaussian planar symmetry. The effect of the first electric field is defined by $$\vec{E} = \frac{\sigma}{2\varepsilon_0}$$

increasing to $$\frac{\sigma}{\varepsilon_0}.$$

Figure 5:
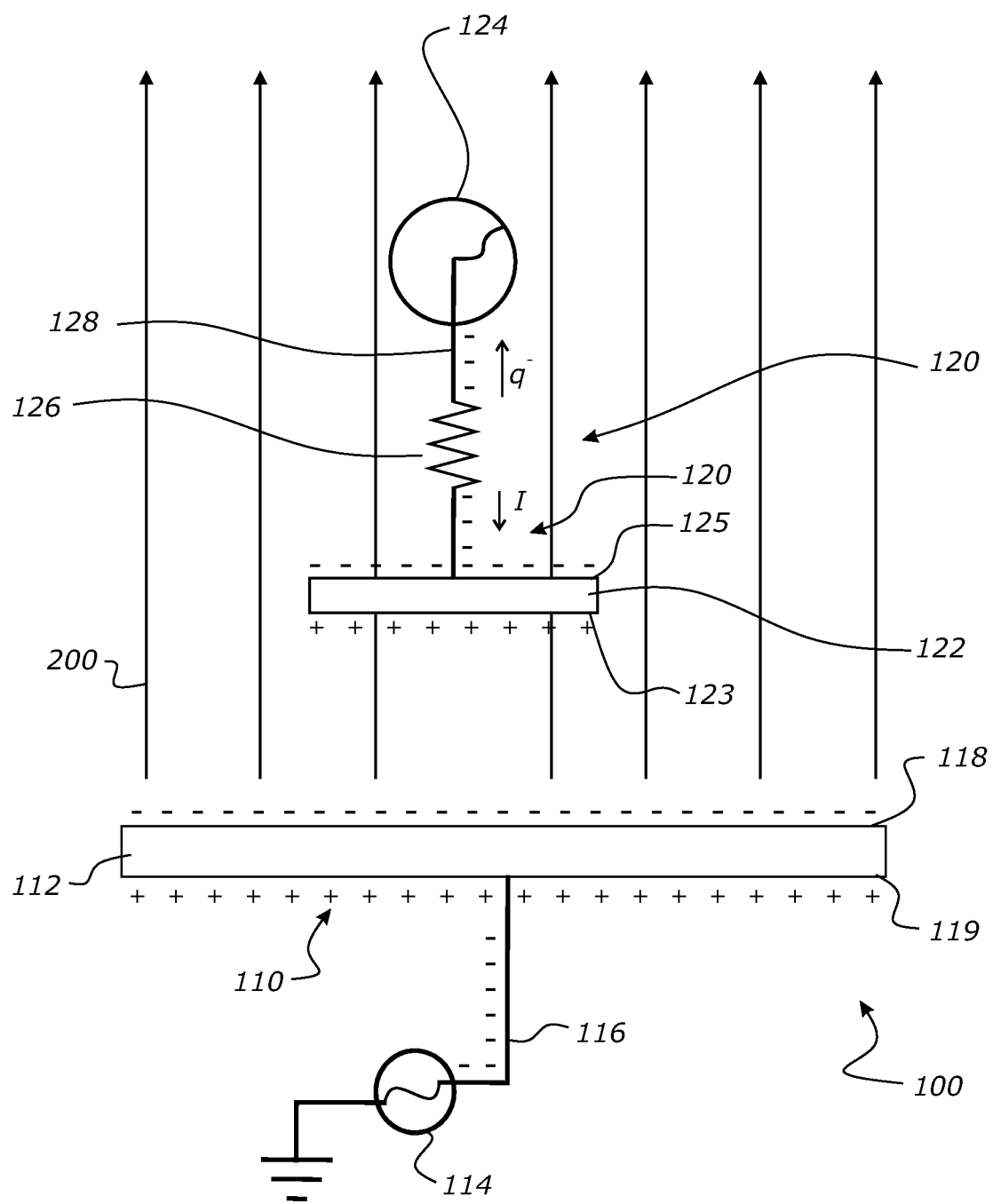
Figure 6:
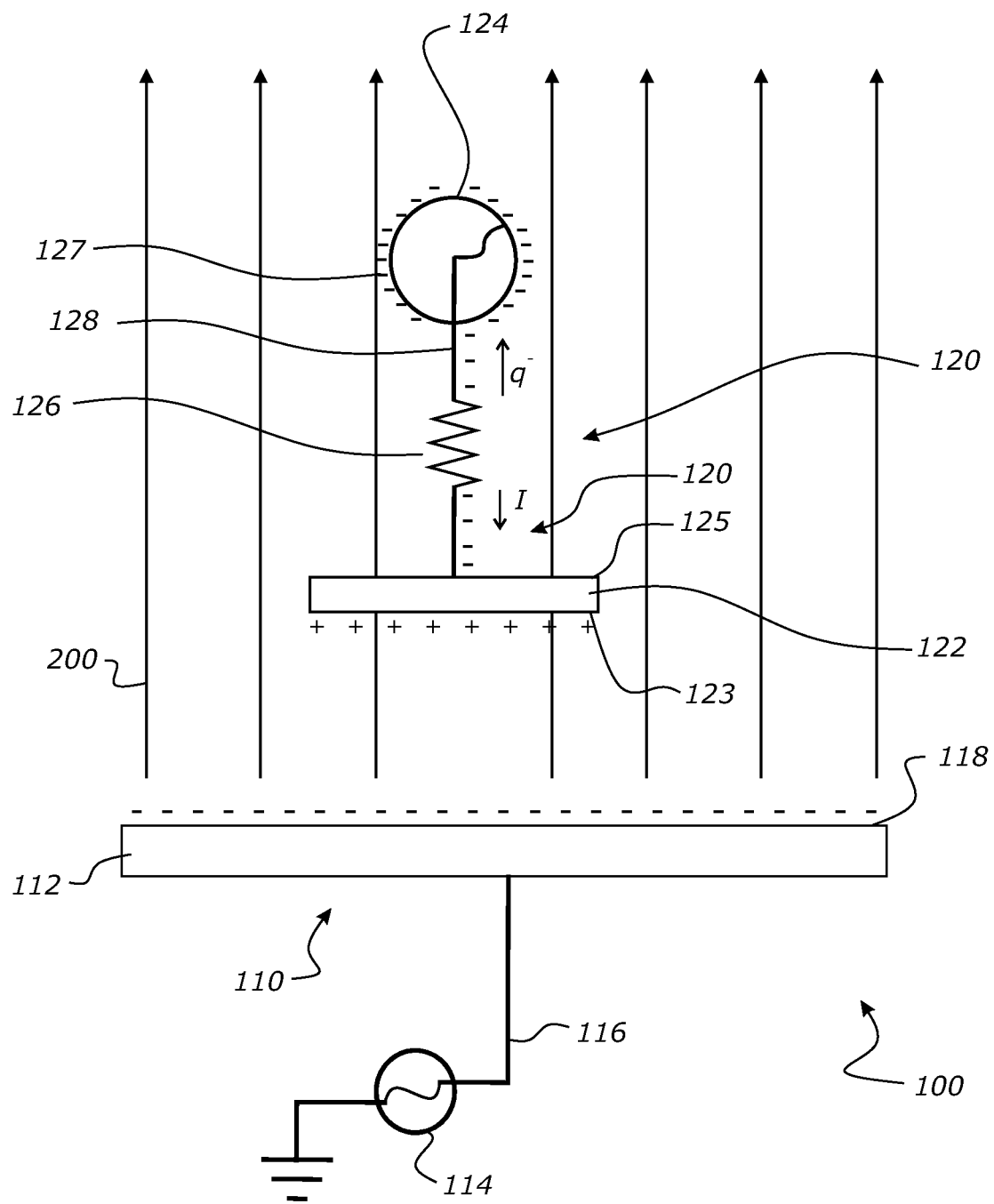

The effect of the first electric field on the first element strengthens over time, where $\varepsilon_0$ defines. The first electric field 200 has a constant effect on the first element 122 irrespective of the transmission distance Negative charge migrates away from the first element 122 to the second element 124 via the conductor 128. Negative charges "−" migrate from the first element 122 to the second element 124 due to the presence of a conductive pathway 128 and due to the different effects of the first electric field 200 on the first element 122 and the second element 124. The second electric field 202 does not build to any significant strength due the negative charge migrating from the first element 122 to the second element 124. FIG. 5 shows the negative charges "−" migrating along the conductive pathway 128 to the second element 124. The negative charge "−" continues to migrate to the second element until either the first element is depleted of charge or until the second element 124 is saturated with charge. FIG. 6 shows an example of the charge building on the second element 124 and moving away from the first element 124. As can be seen in FIG. 6, the charge received at the second element 124 moves to an outer surface 127 of the second element 124.

The first electric field 200 has a lesser effect on the second element 124 as compared to the effect on the first element 122. The effect of a constant electric field i.e. the first electric field 200 on the second element is given by $$\vec{E} = \frac{1}{r^2}$$

increasing to $$\frac{1}{r^3},$$

where r in this case is equal to the total distance the second element 124 is away from the transmission element (i.e. the transmission distance 300+the conduction distance 302). These equations define the effect of a constant electric field on a sphere in accordance to Gaussian spherical symmetry.

The difference in the electric field effect on the first element 122 and the second element 124 is due to the first element 122 and second element 124 having different geometries, and hence different Gaussian shapes (i.e. geometries) when compared to each other. The first element 122 and second element 124 have different geometries and are governed by different Gaussian symmetries. As described earlier, in the illustrated embodiment of FIG. 2 the first element 122 is governed by a Gaussian plate symmetry and the second element 124 is governed by a Gaussian sphere symmetry. This is because the first element 122 is a rectangular plate and the second element 124 is a sphere. As can be seen by the equations above, defining the electric field effects, the effect of the electric field on the second element is less than the effect of the electric field on the first element. This is because the second element 124 comprises a geometry (i.e. topology) that is governed by Gaussian spherical symmetry and the first element 122 comprises a geometry (i.e. topology) that is governed by Gaussian plate symmetry. The different field effect from the first electric field 200 on the first and second elements 122, 124 of the receiver causes a charge to migrate and hence a current to flow. Current I flows through the load 126 and hence power is utilised in accordance to Ohms Law $W=I^2.R_L$. The difference in the field effects strengthens over time, as shown in the equations above regarding field effect, thereby causing increased charge to migrate from the first element 122 to the second element 124.

The migration of charge from the first element 122 to the second element 124 reduces the strength of the second electric field 202. Therefore the field effect of the second electric field 202, on the second element 124 is reduced. The second electric field 202 cannot build as charges escape from the first element 122 to the second element 124 until the second element 124 is saturated or the negative charge from the first element is depleted. As the conduction distance 302 increases, the effect of the first electric field 200 on the second element 124 is reduced thus enhancing the charge migration. The different Gaussian symmetries of the first element 122 and second element 124 induces different charge densities on the first element 122 and the second element 124. The conductive distance 302 may be greater than or less than but is less than the point where the first electric field 200 has no effect on the second element 124 of the receiver 120. The reduction in the field effect is proportional to transmission distance 300 plus the conductive distance 302 all cubed.

The second element 124 functions as a charge well. In the illustrated embodiment the second element 124 is a hollow sphere. Charge is carried inside the sphere and conducted to the outside or outer surface of the sphere (i.e. the second element 124) until the breakdown voltage of the second element 124 is reached or until all the negative charge from the first element 122 is depleted. The charge moves to the outer surface of the hollow sphere based on the Van der Graff principle. The charge received at the second element 124 continues to be conducted to the outside surface of the sphere 124 until a breakdown voltage is reached or until the charge on the first element 122 is depleted.

Negative charge moving from the first element 122 to the second element 124, hence by convention current flow from the second element 124 to the first element 122 (since current flow is considered as flow of positive charges). The charge migration and hence current flow is caused due to the geometric differences between the first element 122 and second element 124. When the alternating power source 114 switches polarity charge is depleted from the transmission element 112. This depletion of charge on the transmission element causes the first electric field 200 to dissipate.

Dissipation of the first electric field 200 causes the charges are redistributed in the components of the receiver i.e. charges redistribute between the first element 122 and the second element 124. This results in a current flowing between the first element 122 and the second element 124 and through the load 126, in the direction shown in FIGS. 5 and 6. Therefore when the transmission element 112 is charge enriched by the alternating power source 114, current flows I the first element 122 to the second element 124, via the load 126. When the transmission element 112 is charge depleted, current I flows from the second element 124 to the first element 122 as the charges in the receiver 120 attempt to redistribute.

Figure 7:
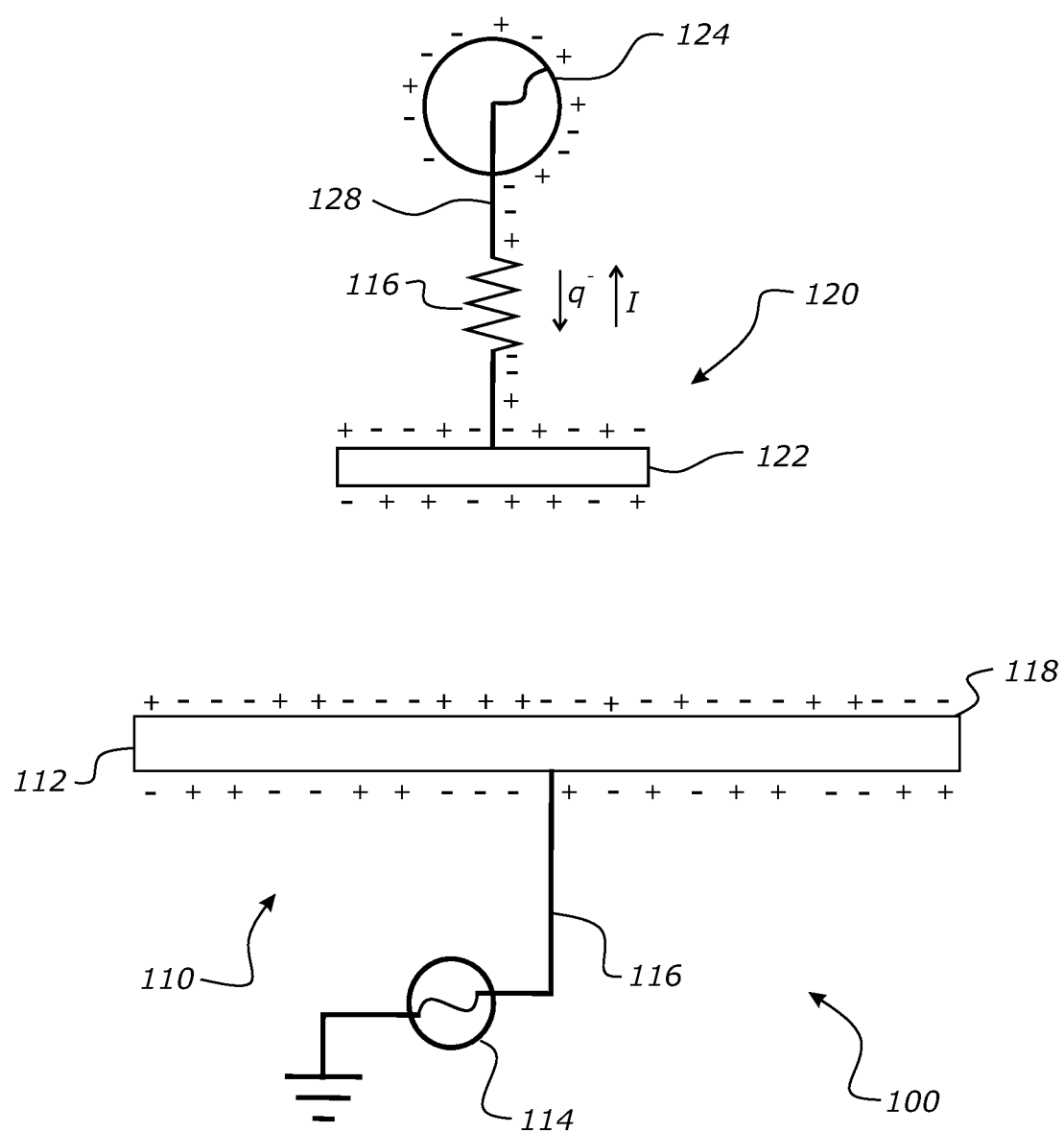

FIG. 7 illustrates shows a schematic view of the operation of the system when polarity of the power supply is switched. As shown in FIG. 7, the charge on the transmission element 112 redistributes along the transmission element 112. Since there is no region of increased negative charge this causes the first electric field 200 to dissipate. Since there is no electric field 200 the negative charges from the second element 124 travel to the first element 122 in order to redistribute charge across the receiver. The negative charges move from the second element 124 to the first element 122 in this cycle via the second conductor 128. There is a net flow of negative charge from the second element 124 to the first element 122 because the second element 124 was primarily negatively charged in the first cycle with reference to FIGS. 3 to 6. Hence current I flows from the first element 122 to the second element 124 (since conventionally current flow is considered as the flow of positive charges). The current flow I flows through the load 126 in the direct shown and hence the load consumes power.

The alternating power source 114 performs work to enrich and deplete charge from the transmitter 110. The transmitter generates a varying electric field 200 due to the enrichment and depletion of charge. The varying electric field 200 transferred via the varying electric field 200. The load 126 is configured to harvest the work performed by the alternating power source 114, due to the current flowing between the first element 122 and the second element 124 of the receiver 120. The wireless power transfer system 100 can function as a charge resonant circuit since charge can resonate between the first element 122 and the second element 124, of the receiver 120. The resonance frequency is dependent on the frequency of the varying electric field, which is related to the frequency of the alternating power source 114.

Figure 8:
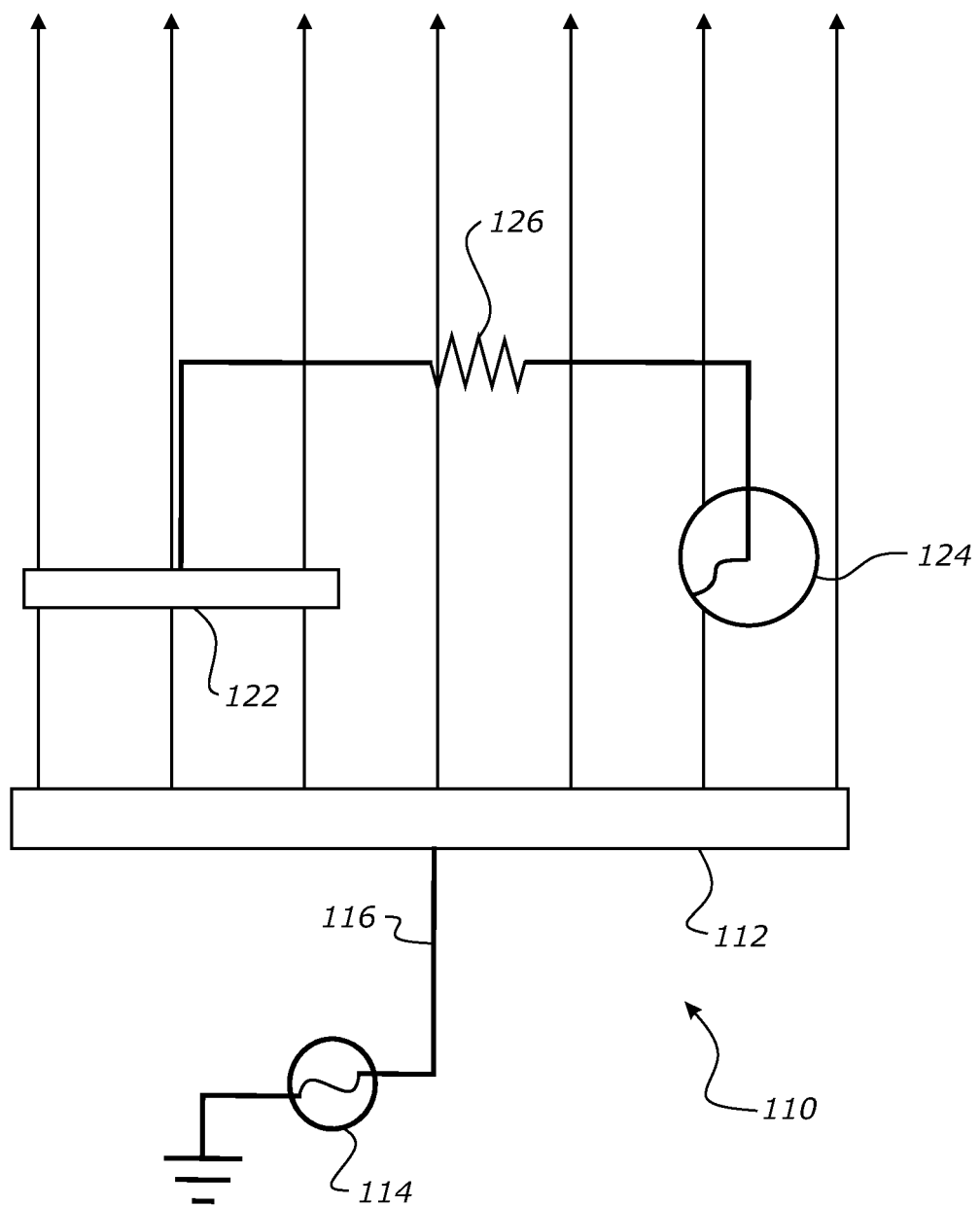
FIG. 8 shows an alternative configuration of the first and second elements of the receiver, of the wireless power transfer system.

FIG. 8 shows an alternative configuration of the first and second elements 122, 124 of the receiver 120. Referring to the configuration shown in FIG. 8, the second element 124 is positioned at the same distance as the first element 122 from the transmission element 112. The charge migration would still function in the configuration shown in FIG. 8 where the first element 122 and second element 124 are equidistant from the transmission element 112. The wireless power transfer system configuration shown in FIG. 8 would still function the same as the configuration shown in FIGS. 1 and 2. In this configuration the electric field generated by the transmission element 112 will have a first effect on the first element 122 and a second effect on the second element 124 similar to that described above. The first element 122 will have charge migrate toward the second element 124 because of the different effects from the first electric field on the first element 122 and second element 124. The first element 122 and second element 124 behave differently in response to an electric field because they comprise different geometries (i.e. shapes) as compared to each other. The first element 122 and second element 124 are governed by different Gaussian symmetries due to their geometric (i.e. shape) differences. Charge will migrate from the first element 122 to the second element 124 due to the electric field 200 having differing effects on the first element 122 and the second element 124.

Figure 9:
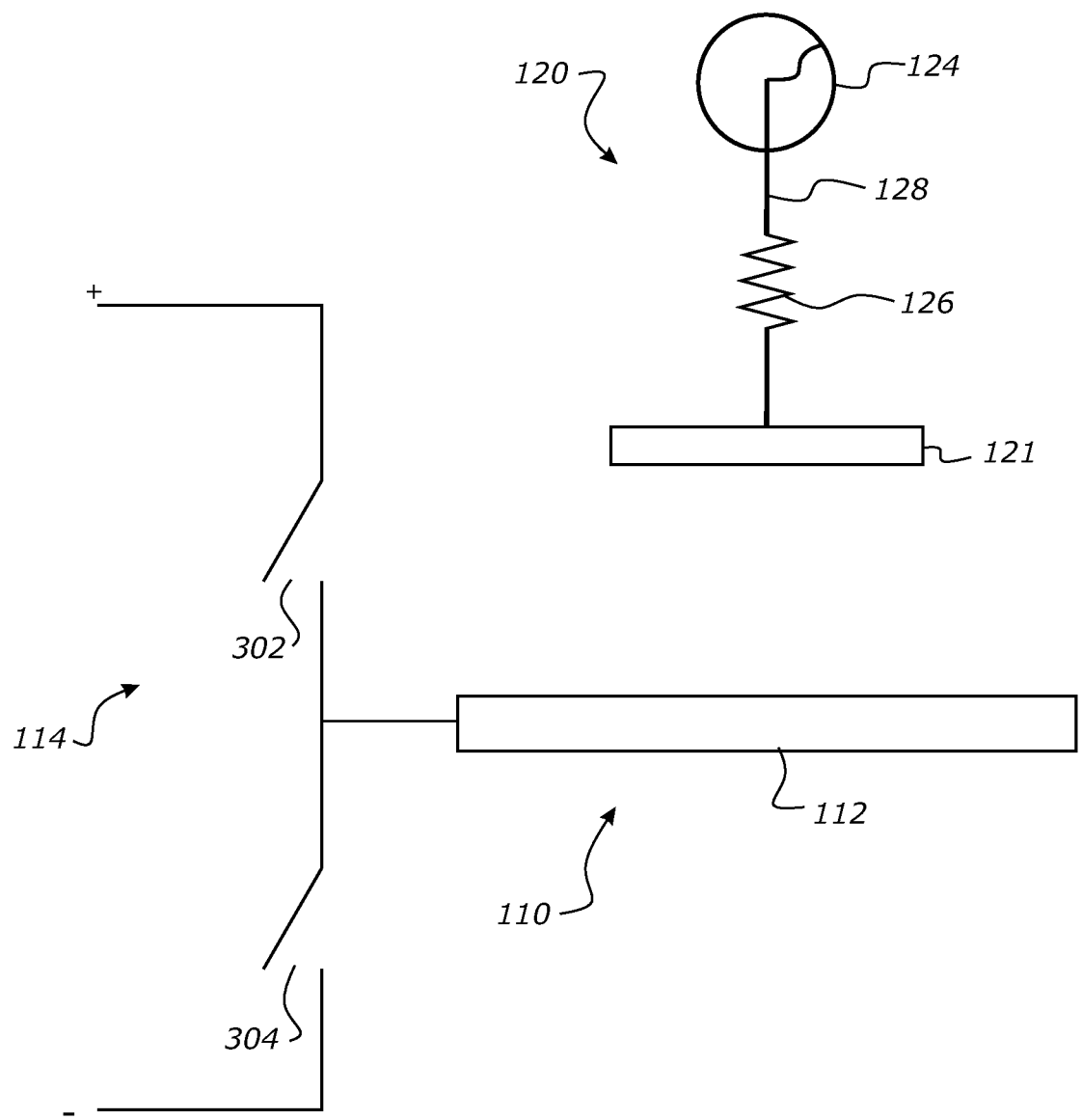
FIG. 9 shows an exemplary configuration of the power supply.

FIG. 9 shows an exemplary configuration of a power supply 114 that can be used. The power supply 114 may comprise a plurality of switches that control the delivery of charge to the transmission element 112. A feature of the wireless power transfer system 100 as described herein is that there is no return line to the power supply. Existing power transfer systems such as inductive or capacitive power transfer systems require a conductive line to return and connect to the power supply. The wireless power transfer system described herein functions effectively as an open circuit because there is no return line. As shown in FIG. 9 the power supply 114 comprises a pair of switches 302, 304 and the transmission element 112 is connected between the switches. The transmission element 112 is connected downstream of the first switch 302 and upstream of the second switch 304. The switches connect between positive and negative rails 306, 308 of the power supply. The switches are operated to switch the polarity of the power signal delivered to the transmission element 112. Conventional current flows from the positive rail 306 to the negative rail 308. The first switch 302 is closed to introduce charge onto the transmission element 112. The second switch 304 is maintained open to allow charge to build on the transmission element 112. As the charge builds on the transmission element an electric field 200 will form (as described earlier) and have a differing effect on the first element 122 and second element 124 of the receiver 120. The differential field effect will cause a charge migration and hence a current flow between the first element 122 and the second element 124.

In order to switch polarity the second switch 304 is closed and the first switch 302 is opened such that charge can flow away from the plate toward the negative rail. The switch in polarity will cause charge to dissipate from the transmission element 112. The switches 302 and 304 can be constantly opened and closed in the order described to charge the transmission element 112 and build the electric field 200 and discharge the transmission element 112 in order to achieve charge migration (and hence a current flow) between the first element 122 and the second element 124 of the receiver 120. The switching rate of the switches 302, 304 can be pre-defined and is fast enough to cause current to flow between the first element 122 and second element 124 of the receiver. The power supply configuration 114 shown in FIG. 9 may include additional smoothing circuitry or any additional circuitry that forms part of a power supply. The power supply 114 may further comprise an electronic controller (not shown) that electrically communicates with the switches 302, 304 to actuate the switches. The controller includes logic or computer readable instructions stored in a memory unit that cause the controller to actuate the switches based on a predetermined switching pattern. The switching pattern may define a frequency of the power source i.e. the frequency at which the transmission element is charged and discharged. The power supply configuration 114 as shown in FIG. 9 allows supply of power to the transmission element using an open circuit since there is no return path from the receiver.

Figure 10:
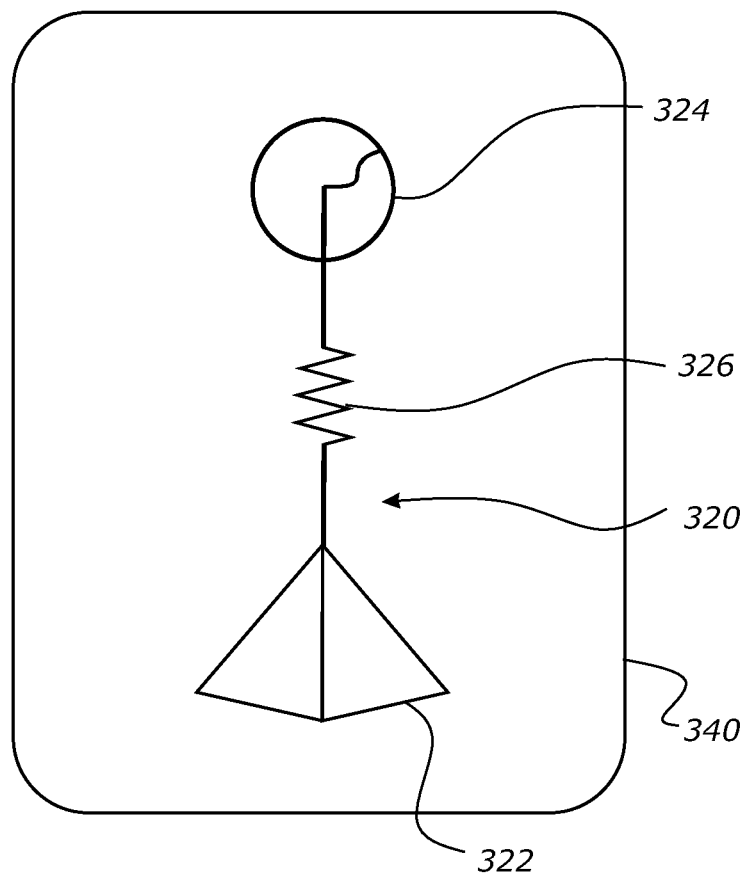
FIG. 10 shows an exemplary implementation of the wireless power transfer system for charging a mobile device.
Figure 10:
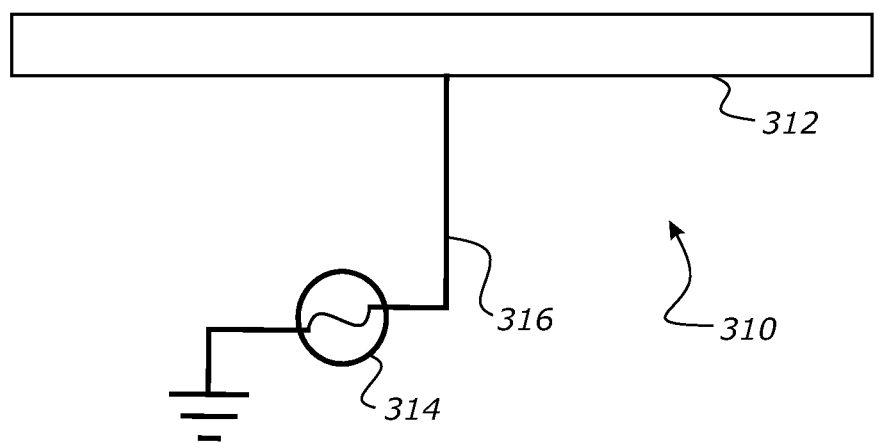

FIG. 10 illustrates a further embodiment of the wireless power transfer system 300. The embodiment of the wireless power transfer system 300 functions in the same manner as the embodiment 100 shown in FIGS. 1 and 2. Like numbers are used to denote like features. Referring to FIG. 10, the wireless power transfer system 300 comprises a transmitter 310 and a receiver 320. The transmitter 310 comprises a transmission element 312. The transmission element 312 is a substantially planar element. In the illustrated embodiment the transmission element 312 is a rectangular plate. The plate may be rigid or may be flexible. The transmission element 312 preferably comprises a conductive element or is conductive. In one example the transmission element 312 may be a rectangular charging mat that may be disposed on or within a table, floor or may be incorporated into a portable charging pod. The transmission element 312 is substantially similar to the transmission element 112 as described.

In the embodiment shown in FIG. 10, the receiver 320 of the wireless power transfer system 300 comprises a first element 322 and a second element 324. The first element 322 comprises a first three dimensional geometry or topology (i.e. shape) and the second element 324 comprises a second three dimensional geometry or topology, wherein the first and second geometries are different to each other. The first element 322 comprises a geometry (i.e. shape) of a three dimensional polygon that includes a plurality of flat faces. In the illustrated embodiment, of FIG. 10, the first element 322 is a square based pyramid in shape and has a plurality of flat faces. At least one flat face of the first element 322 is arranged substantially parallel to the transmission element 312. The parallel arrangement maximises the field effect on the first element 322 from the electric field emanating from the transmission element in use.

The second element 324 comprises a three dimensional geometry including one or more curved surfaces. Preferably a majority of the second element's 324 geometry (i.e. shape) is delimited by a continuous curved surface. In the illustrated embodiment of FIG. 10, the second element 324 comprises a sphere. The sphere is a closed hemisphere comprising a curved surface. Alternatively the second element may be a hemisphere or a cylinder or any other closed three dimensional shape that comprises a continuous curved surface. The wireless power transfer system 300 as illustrated in FIG. 9 functions in the same manner as the wireless power transfer system 100 as described with reference to FIGS. 2 to 7. The transmission element 312 is electrically coupled to the power supply 314. The transmission element 312 is charged with a changing polarity which creates and dissipates an electric field. The changing electric field induces charge migration between the first and second elements 322, 324, thereby causing a current to flow through the load 326 interconnected between the first and second elements. The charge migration is caused due to the differing effect of the electric field on the first and second elements 322, 324.

FIG. 10 further shows an exemplary implementation of the wireless power transfer system 300. The wireless power transfer system 300 is utilised to charge the battery of a phone. The transmission element 312 can be charging mat or a charging pad positioned on a table or located in a charging surface of a charging pod. The receiver 320 is located within the mobile device 340, which in FIG. 10 is a mobile phone. However the mobile device can be any other mobile or wearable device such as earphones, a tablet, a smartphone, a fitness tracker and the like. The transmission element 312 induces a differential charge on the first and second elements of the receiver 320 positioned within the mobile device 340. The load 326 is preferably a rechargeable battery. Alternatively load element 326 may be any suitable component or circuit that consumes electrical power such as for example lamp or transformer or motor or any other suitable component or circuit. The receiver 320 is located within a housing of the mobile phone and may be formed on a circuit board such as printed circuit board with the other electronics of the mobile device 340.

Figure 11:
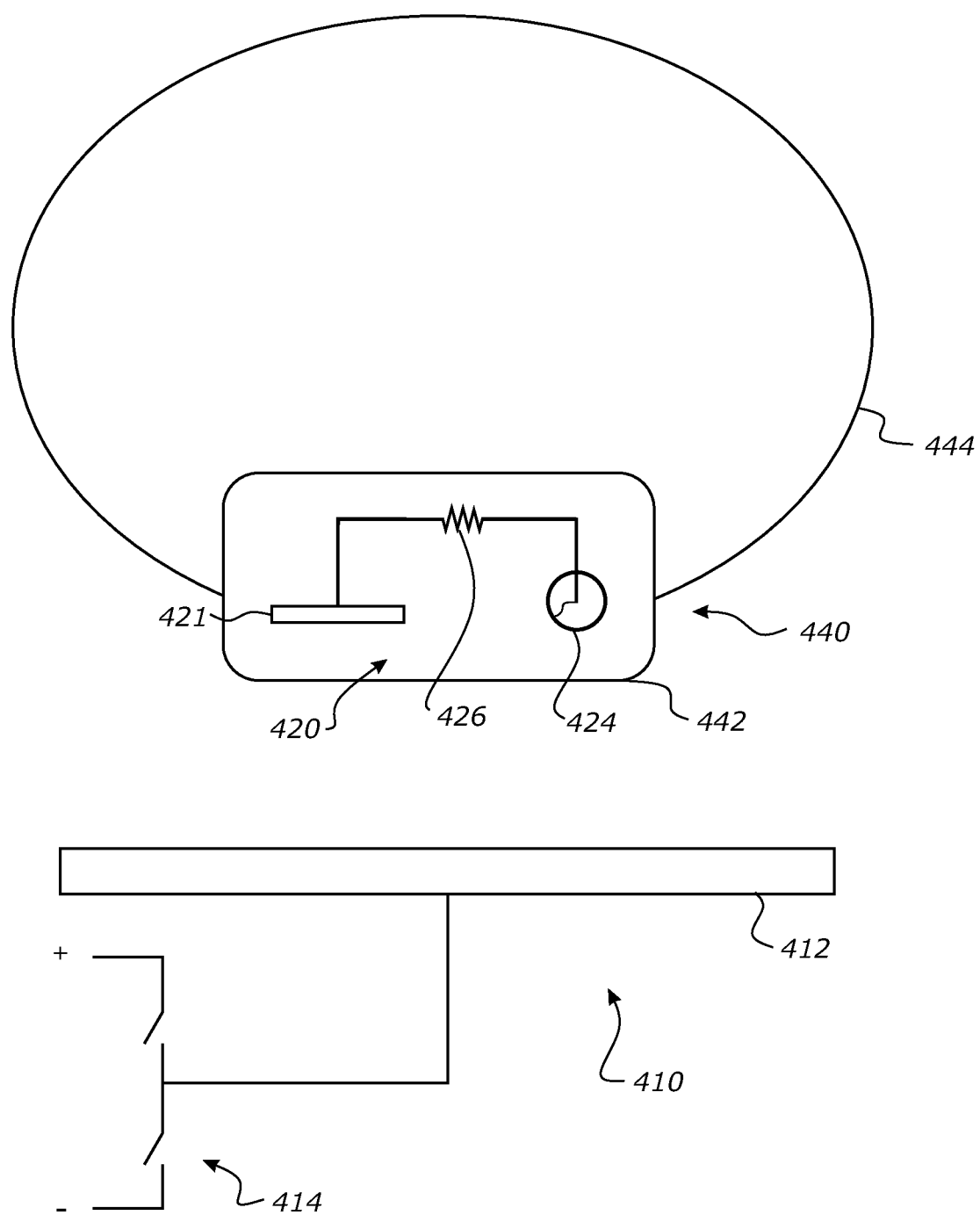
FIG. 11 shows an exemplary implementation of the wireless power transfer system for charging a wearable device.

FIG. 11 shows another exemplary use of the wireless power transmission system 100. Referring to FIG. 11 the wireless power transmission system 100 is used to charge a rechargeable battery 426 within a wearable device 440. The wearable device 440 may be a watch or a fitness tracker or a physiological monitor or any other wearable device. The wearable device 440 comprises a body 442, and the receiver 420 is retained within the body 442. The receiver 420 includes a first element 422 and a second element 424 and a load element 426. The load element 426 is a rechargeable battery or a battery recharging circuit. The load 426 is connected to a ground pin or wire. The transmitter 410 comprises a transmission element 412 that is connected to a power supply 414. The transmission element 412 is preferably plate shaped and may be a charging mat or charging pad disposed on a table or other structure. The power supply 414 may have a similar configuration to the power supply shown in FIG. 9. The first element 422 and the second element 424 may be arranged in a similar configuration to that shown in FIG. 8, just within the body 442 of the wearable device 440. The wearable device 440 includes a strap 444 to attach the device onto a user. The body 442 defines a hollow housing that retains the receiver 420, its components and other electronics. The receiver 420 may be formed on a circuit board such as a printed circuit board. In other exemplary forms the load elements 426 may be a lamp or a motor or a transformer or any other suitable electrical component or electrical circuit that consumes electrical power.

The transmission element and, the first element and second element of the receiver, are made of conductive materials such as metals or conductive plastics. The transmission element and, the first element and second element of the receiver, may also include additional insulating materials such as a layer of plastics material or silicone material to prevent shocks to users due to touching the wireless power transfer system.

In another exemplary embodiment the present invention relates to a wireless power transfer system comprising; a transmitter configured to create a varying electric field and a receiver within the varying electric field. The receiver in the varying electric field being separated from the transmitter and the receiver comprising a first element and a second element. The first element having a first geometry or topology and the second element having a second different geometry or topology to the first element. The electrical characteristics/behaviour of each element being different to each other when in the varying electric field, such that a current flows between the first element and second element when connected to a load due to interaction between the varying electrical field and the first element and the second element. The transmitter comprises a plate, the first element is a plate and the second element is a sphere (or other spheroid). Preferably the first element is governed by Gaussian planar symmetry and the second element is governed by Gaussian spherical symmetry. However alternatively other geometries for the first element and second element are contemplated. The first element and second element comprise geometries that are different to each other. The electric characteristic of each element being the polarization of each element in the presence of the varying electric field. The varying electric field polarizing the first element of the receiver to a first level, the varying electric field polarizing the second element of the receiver to a second level, wherein the difference in polarization causes a current to flow between the first element and second element and through a load electrically connected between the first and second element.

Alternatively the electric characteristic may be the electrical field effect from the varying electric field, wherein the first and second elements experience a different electrical field effect thereby causing a current to flow through a load connected between the first and second element. Each of the first and second elements experience a different electrical field effect due to the different geometry/topology of the first and second elements.

The wireless power transfer system as described herein is advantageous because it does not include a return path. The wireless power transfer system is advantageous because it creates a current flow through a load in an open circuit and hence does not require a closed circuit. This is advantageous because the wireless power transfer system 100 can be simpler to construct and use as there is no return path needed back to the power source. The power supply configuration comprises switches, as shown in FIG. 9, is advantageous because it allows charging and discharging of the transmitter element using an open circuit. The power supply configuration does not require any return path and uses the switches to control polarity.

The wireless power transfer system as described herein utilizes a varying or switching electric field acting on two differently shaped elements of a receiver to achieve a current flow between the two elements. In particular the two elements comprise two different Gaussian symmetries that induces differing charge densities on the two elements and thereby causes a current to flow. The wireless power transfer system is advantageous as power is transferred wirelessly. Further the wireless power transfer system 100 is advantageous because it utilises a varying electric field to create work in the conductor (i.e. conductive wire) of the receiver, and the power is harvested by the load of the receiver.

The wireless power transfer system allows for increased transmission distances as compared to other power transfer methodologies. The use of an electric field to transfer power between a transmitter and receiver allows for a greater transmission distance because an electric field can act over greater distances than inductive coupling systems.

The nature of power transfer due to or via an electric field, also allows for the potential for miniaturization of the system as long as the transmission element is sufficiently larger in size than the first element of the receiver. Size as referred to above can mean surface area of the transmission element and first element. Alternatively size may mean the area of a planar surface of the transmission element is larger than the area of a corresponding parallel planar surface of the first element of the receiver. The wireless power transfer system as described herein can be more readily miniaturized than an inductive power transfer system since there are no coils in the system.

Further the wireless power transfer system as described herein produces less heat, and is immune to foreign objects located between the transmitter and receiver and can also act through electrically isolated metal.

The wireless power transfer system as described herein can potentially be used in a variety of uses. Some exemplary products or uses could be for wireless charging of wearable devices or wireless power transfer in MEMs devices. Other applications are also contemplated herein.

The invention claimed is:

1. A wireless power transfer system comprising:
a transmitter arranged to generate a varying electric field,
a receiver located in the varying electric field, the receiver comprising a first element and a second element, the first element and the second element having different three dimensional geometries governed by different Gaussian symmetries, so different charge densities are induced on the first element and the second element by the varying electric field such that, in use, a current flows between the first element and second element, through a load.

2. The system as claimed in claim 1 wherein the first element is a three dimensional element having one or more planar surfaces and the second element is a rounded three dimensional element.

3. The system as claimed in claim 2 wherein the first element is a plate and wherein the second element is one of a sphere, spheroid, ellipsoid, toroid, or cylindrical in shape.

4. The system as claimed in claim 2 wherein the first element comprises a geometry that is governed by a Gaussian plate symmetry and the second element comprises a geometry that is governed by a Gaussian spherical symmetry.

5. The system as claimed in claim 1 wherein a planar surface of the one or more planar surfaces of the first element is configured to be arranged substantially parallel to the planar conductive transmission element.

6. The system as claimed in claim 1 wherein the transmitter and the receiver are separated by a transmission distance and the transmission distance is less than the point where the transmitter can be considered a point charge.

7. The system as claimed in claim 1 wherein the first element and the second element are separated by a conduction distance and wherein the conduction distance is less than the point where the varying electric field has no effect on the second element and wherein the transmission distance and conductive distance are different to each other.

8. The system as claimed in claim 1 comprising an alternating power source in electrical communication with the transmitter, the varying and wherein the alternating power source enriches and depletes the transmitter with charge, thereby creating the varying electric field.

9. The system as claimed in claim 1 wherein work is performed by the alternating power source to generate the varying electric field and the load configured to harvest the work done by the alternating power source.

10. The system as claimed in claim 1 wherein the varying electric field causing charge migration between the first element and second element due to the varying electric field having a different effect on the first element and the second element, and wherein the charge migration between the first and second element resulting in a current to flow through a load between the first element and the second element.

11. A wireless power receiver comprising:

a first conductive element, a second conductive element, and a load electrically connected therebetween, the first element and second element comprising different three dimensional geometries governed by different Gaussian symmetries as compared to each other such that different charge densities are induced thereon in the presence of a varying electric field, and;

a current flows between the first element and the second element through the load.

12. The receiver as claimed in claim 11 wherein the first element is three dimensional planar element and the second element is a rounded three dimensional element.

13. The receiver as claimed in claim 12 wherein the first element is a plate and the second element is one of a sphere, spheroid, ellipsoid, toroid or cylindrical in shape.

14. The receiver as claimed in claim 12 wherein the first element comprises a shape that is governed by a Gaussian plate symmetry and the second element comprises a shape that governed a Gaussian spherical symmetry.

* * * * *